US007010759B2

(12) United States Patent
Janu

(10) Patent No.: US 7,010,759 B2
(45) Date of Patent: Mar. 7, 2006

(54) METHOD FOR REAL TIME DISPLAY OF MAINTENANCE DEVICE LOCATION IN AN INTERNAL SPACE

(75) Inventor: David G. Janu, Brookfield, WI (US)

(73) Assignee: U-Tech Enviromental Manufacturing Supply, Inc., Menomonee Falls, WI (US)

( * ) Notice: Subject to any disclaimer, the term of this patent is extended or adjusted under 35 U.S.C. 154(b) by 530 days.

(21) Appl. No.: 10/118,510

(22) Filed: Apr. 5, 2002

(65) Prior Publication Data
US 2003/0189596 A1 Oct. 9, 2003

(51) Int. Cl.
*G09G 5/00* (2006.01)

(52) U.S. Cl. .................. 715/848; 715/764; 356/237.1; 348/84

(58) Field of Classification Search ............... 348/771, 348/772, 782, 848, 800, 803, 854, 84; 901/46; 700/245; 701/200; 715/848, 764; 356/237.1
See application file for complete search history.

(56) References Cited

U.S. PATENT DOCUMENTS

| | | | | |
|---|---|---|---|---|
| 5,006,991 | A * | 4/1991 | Ohcoshi et al. ............. | 700/178 |
| 5,339,392 | A * | 8/1994 | Risberg et al. ............. | 345/762 |
| 5,440,492 | A * | 8/1995 | Kozah et al. ............... | 701/221 |
| 5,736,821 | A * | 4/1998 | Suyama ........................ | 318/16 |
| 5,742,517 | A * | 4/1998 | Van Den Bosch .......... | 382/141 |
| 5,812,962 | A * | 9/1998 | Kovac ......................... | 701/208 |
| 5,898,433 | A * | 4/1999 | Hijikata ...................... | 345/782 |
| 5,920,395 | A * | 7/1999 | Schulz ........................ | 356/622 |
| 6,023,986 | A * | 2/2000 | Smith et al. ............... | 73/866.5 |
| 6,501,391 | B1 * | 12/2002 | Racunas, Jr. ............. | 340/932.2 |
| 6,529,217 | B1 * | 3/2003 | Maguire et al. ............. | 345/769 |
| 6,651,001 | B1 * | 11/2003 | Apsell ........................ | 701/213 |
| 6,675,032 | B1 * | 1/2004 | Chen et al. ................. | 600/407 |
| 2004/0021858 | A1 * | 2/2004 | Shima et al. ............ | 356/241.1 |

OTHER PUBLICATIONS

A Screen Shot of a Pipe Tech Sewer Inspection Software Program, Circled Area Indicates a Change in Color to Show the Position of the Camera in the Pipeline.
A Photocopy of a Page From a Spering Micro-Systems Brochure Illustrating a Static Pipeline Graphic.
A Photocopy of a Page From a Pipe Tech Brochure Illustrating a Static Pipeline Graphic.
Photocopy of (3) Pages From a Cues Brochure Illustrating a Static Pipeline Graphic.

* cited by examiner

*Primary Examiner*—Cao (Kevin) Nguyen
*Assistant Examiner*—Ting Zhou
(74) *Attorney, Agent, or Firm*—Donald J. Ersler

(57) ABSTRACT

A method for real time display of maintenance device location in an internal space includes a real time location display. An inspection window includes the real time location display, an observations spreadsheet, and a distance display. If the maintenance device is a video camera, a video screen is also included in the inspection window. The inspection window is displayed on a computer monitor. As a video camera is moved through an internal space, a video signal and distance signal are sent to a computer. Location display software on the computer receives the distance signal and provides a real time location display of the distance that the video camera has traveled. The observations spreadsheet enables an operator to enter information concerning a particular distance measurement of interest and which is also shown on the real time location display. The video screen displays real time video camera feed.

21 Claims, 7 Drawing Sheets

| Vp New Observation: 7 | | |
|---|---|---|
| Category: | Comment: | Distance: |
| Joint | Bricks Missing | 135.4 |
| Pipe | Broken | |
| Roots | Circular Crack | Position: |
| Service | Collapsed | 8 O'clock |
| Inspection | Corrosion | |
| | Crown Missing | Severity: |
| | Deposit | medium |
| | Dropped Connection | |
| | Erosion | Incline: |
| | Flattened | 0.26 |
| | Heavy Damage at Crown | |
| | Heavy Grease | Tape Counter: |
| | | 45.22 |

Notes:
from 8 to 3, light roots

DDU Overlay Text:
Pipe-Circular Crack
8 O'clock

Capture Controls

Save and Send    Cancel

FIG.3

| Vp New Section (4) | | |
|---|---|---|
| Date (today): | Feb. 14, 2002 | ☐ Meters |
| Section Name: | Brady Street | |
| Customer: | Milwaukee DPW | ▶ |
| | 1522 N. State St. | |
| | Milwaukee | WI  53021 |
| Section Type: | Sanitary | ▶ |
| Street Address: | 1500 - 1650 Brady St. | |
| City: | Milwaukee | |
| Start Manhole: | 3102 | |
| End Manhole: | 3103 | |
| Pipe Size: | 12  ▶ | Inches |
| Pipe Material: | Concrete | ▶ |
| Operator: | Dave Janu | ▶ |
| Weather: | Dry | ▶ |
| Cam Direction: | Away - DS | ▶ |
| VCR Tape ID: | 021402a | |
| Save | Cancel | |

METHOD FOR REAL TIME DISPLAY OF MAINTENANCE DEVICE LOCATION IN AN INTERNAL SPACE

BACKGROUND OF THE INVENTION

1. Field of the Invention

The present invention relates generally to performing maintenance in the interior of a pipeline or the like and more specifically to a method for real time display of maintenance device location in an internal space.

2. Discussion of the Prior Art

There are numerous maintenance devices, such as jetting nozzles, root cutters, deflection sensors, and video cameras which are used to perform maintenance in the interior of pipelines, building duct work, conduits, or the like. The location of the maintenance device is always of interest to the operator. Software packages which produce a static model of a pipeline after the pipeline is inspected are well known in the art. The static model software package typically include a database system, video capture, distance tracking, and reporting capabilities. The hardware required to view a pipeline include a video camera, a camera transportation device, and a distance counter.

The software package will take the information gathered from the pipeline inspection and produce a static model of the pipeline. The static pipeline model includes distance measurements which are placed adjacent to the sides of the static pipeline model. The distance measurements correspond to different observations in the pipeline such as cracks, roots, infiltration, laterals, or any other important observation.

With the prior art software packages, the operator cannot instantly travel to another position without carefully watching the video to insure they are in the correct position in the pipeline. Further, a video camera may be damaged if the operator does not stop the camera transportation device, before returning to a starting manhole opening. It appears that no method exists for monitoring the real time location of a video camera, or other maintenance device in a pipeline or the like.

Accordingly, there is a clearly felt need in the art for a method for real time display of maintenance device location in an internal space which enables the viewing of the location of the maintenance device in an internal space, the distance the maintenance device has traveled, a display of the length of pipeline traveled, and distance measurements of important observations in the internal space.

SUMMARY OF THE INVENTION

The present invention provides a method for real time display of maintenance device location in an internal space. The internal space should include pipelines, building duct work, conduits, or other suitable applications. The method for real time display of maintenance device location in an internal space includes a real time location display. An inspection window preferably includes the real time location display, an observations spreadsheet, and a distance display. If the maintenance device is a video camera, a video screen is also included in the inspection window. Preferably, the real time location display, the observations spreadsheet, the video screen, and the distance display are each shown in a separate window. Each of the separate windows are contained within the inspection window, which may be displayed on a computer monitor. The video screen requires the use of some type of video capture device.

Use of the video camera in a pipeline is given by way of example and not by way of limitation, other maintenance devices moving in other internal spaces could also be used. A video camera is moved through a pipeline with a transporter, cable, or other suitable device. The distance that the video camera travels is measured with a distance encoder. The video signal from the video camera is output to an video overlay device. A distance signal from the distance encoder is also output to the video overlay device. The video signal is overlaid with a distance measurement from the distance signal. The overlaid video signal is output to a video recording device and a computer. The video recording device could be a video cassette recorder (VCR), a hard drive of a computer, a compact disc recorder, or any other suitable video recording device. A distance signal from the video overlay device is also output to the computer.

Location display software receives the distance signal and provides a real time location display of the distance that the video camera has traveled. The observations spreadsheet enables an operator to enter information concerning a particular location of interest. The video screen displays the video feed of the video camera. The distance display receives the distance signal and converts the signal into a numeric display.

The real time location display includes an internal space representation and a maintenance device icon. At least one line is used to illustrate the internal space representation. The video camera icon moves lengthwise relative to the at least one line. Optionally, a dimensional scale may be offset to a side of the internal space representation. The dimensional scale can have divisions which are static, such that additional distance traveled by the video camera adds a division to the dimensional scale. The dimensional scale can also be scaled such that the length of the dimensional scale always fits in a set window length. Entry of information into the observations spreadsheet will be represented on the real time location display. If the operator makes an observation at a particular distance, the distance may be shown adjacent the real time location display. A real time dimensional scale with a maintenance device icon located in the center of the real time dimensional scale may be substituted for the dimensional scale.

Accordingly, it is an object of the present invention to provide a method for real time display of maintenance device location in an internal space which enables the real time viewing of the location of the maintenance device in the internal space.

It is a further object of the present invention to provide a method for real time display of maintenance device location in an internal space which displays the distance the maintenance device has traveled.

It is a further object of the present invention to provide a method for real time display of maintenance device location in an internal space that allows a scaled display of the length of internal space traveled in real time.

Finally, it is another object of the present invention to provide a method for real time display of maintenance device location in an internal space that shows in real time the distance measurements of important observations in the internal space.

These and additional objects, advantages, features and benefits of the present invention will become apparent from the following specification.

BRIEF DESCRIPTION OF THE DRAWINGS

FIG. 3 is an observations window of a method for real time display of maintenance device location in an internal space in accordance with the present invention.

FIG. 5 is a section window of a method for real time display of maintenance device location in a pipeline in accordance with the present invention.

DETAILED DESCRIPTION OF THE PREFERRED EMBODIMENTS

Figure 1:
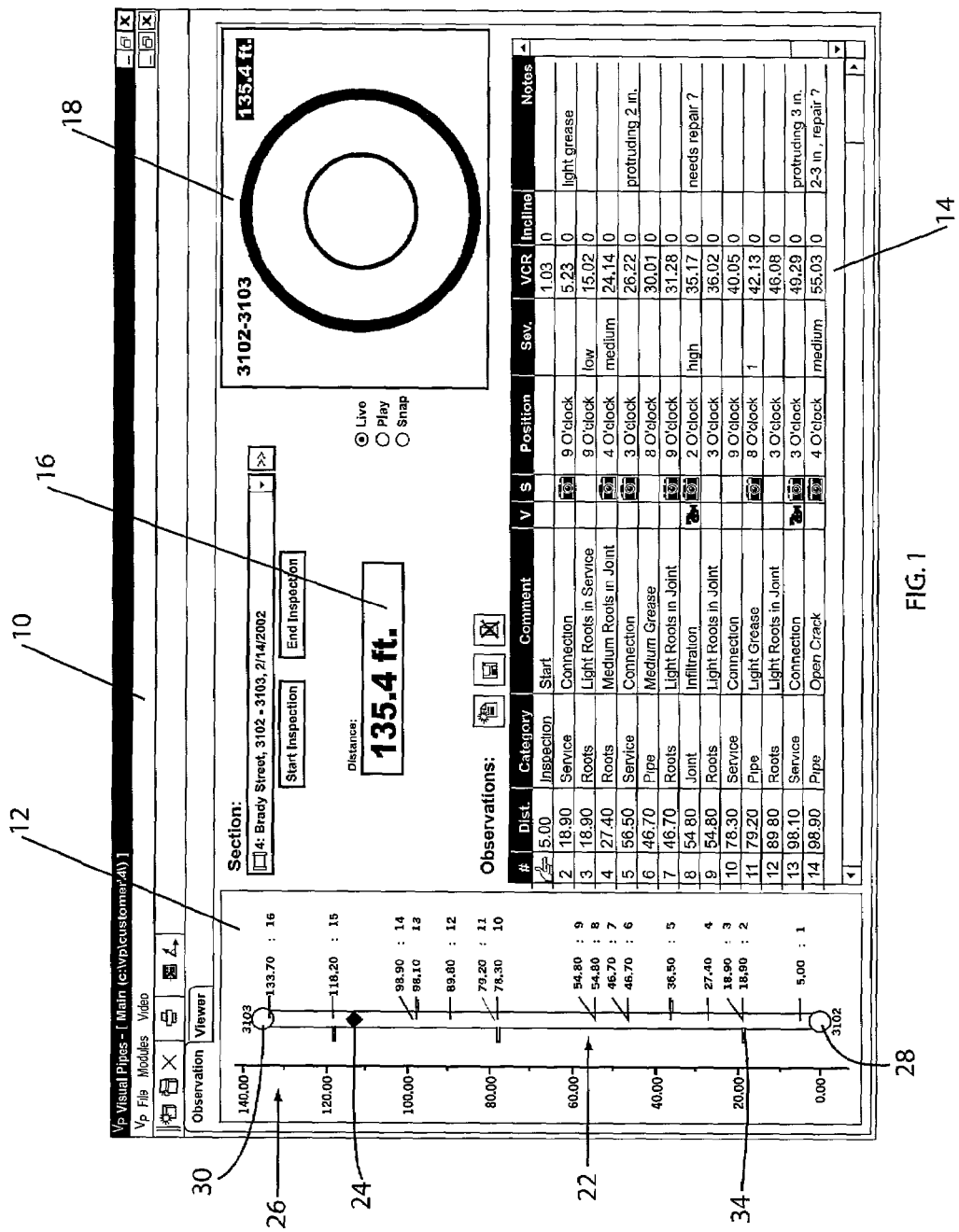
FIG. 1 is an inspection window of a method for real time display of maintenance device location in an internal space in accordance with the present invention.

With reference now to the drawings, and particularly to FIG. 1, there is shown an inspection window 10. The information found in the inspection window 10 is given by way of example and not by way of limitation. The method for real time display of maintenance device location in an internal space includes a real time location display 12. An inspection window 10 preferably includes the real time location display 12, an observations spreadsheet 14, and a distance display 16. If the maintenance device is a video camera, a video screen 18 is also included in the inspection window 10. Preferably, the real time location display 12, the observations spreadsheet 14, the distance display 16, and the video screen 18 are each shown in a separate window. Each of the separate windows are contained within the inspection window 10, which may be displayed on a computer monitor 110. The video screen 18 requires the use of some type of video capture device.

Figure 2:
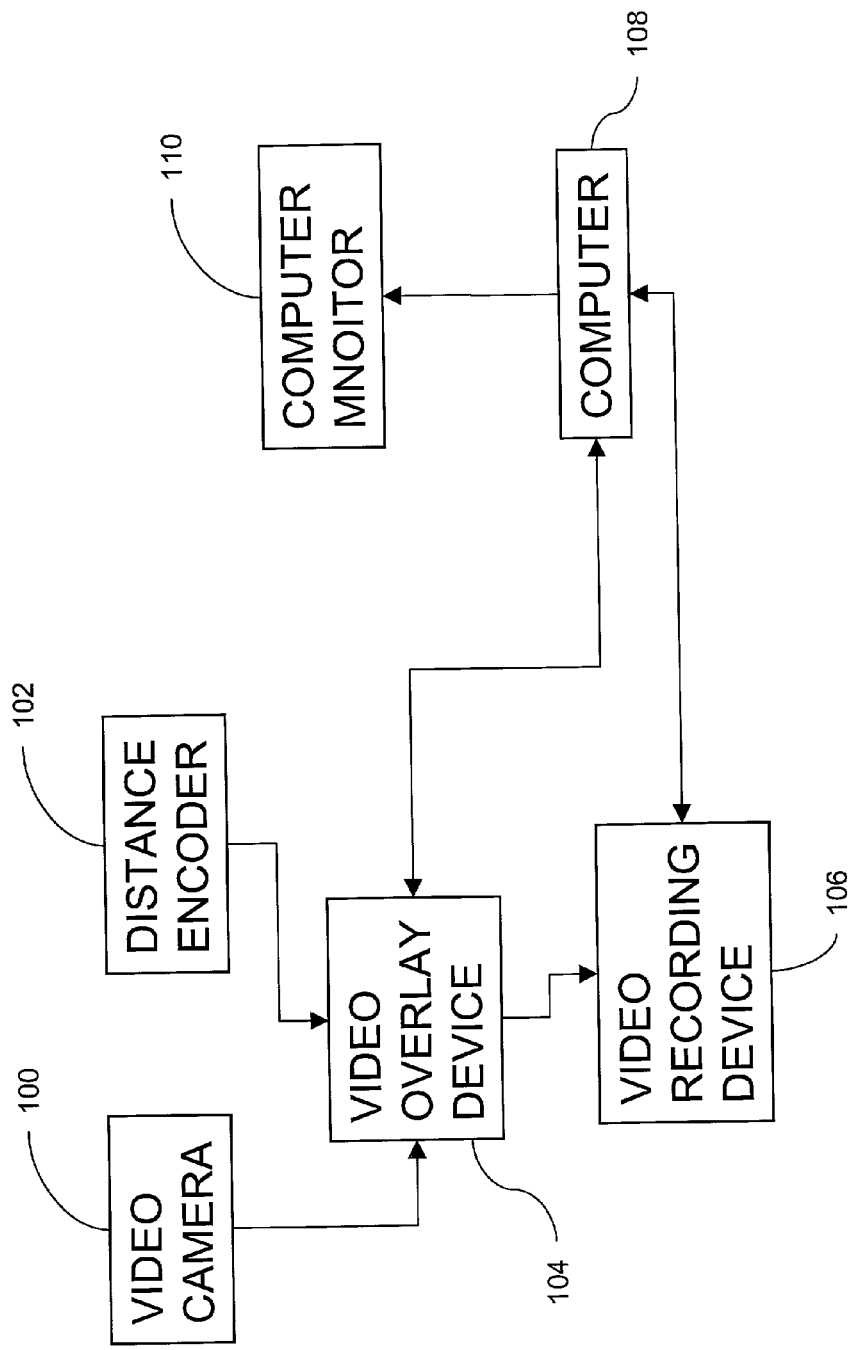
FIG. 2 is a block diagram of hardware devices that gather information in a method for real time display of maintenance device location in an internal space in accordance with the present invention.

With reference to FIG. 2, use of the video camera 100 in a pipeline is given by way of example and not by way of limitation, other maintenance devices moving in other internal spaces could also be used. The video camera 100 is moved through a pipeline with a transporter, cable, or other suitable device. The distance that the video camera 100 travels is measured with a distance encoder 102. A video signal from the video camera 100 is output to an video overlay device 104. A distance signal from the distance encoder 102 is also output to the video overlay device 104. The video signal is continually overlaid with an ever changing distance measurement from the distance signal. The overlaid video signal is output to a video recording device 106 and a computer 108. The video recording device 106 could be a video cassette recorder (VCR), a hard drive of a computer, a compact disc recorder, or any other suitable video recording device. The distance signal from the video overlay device 104 is also output to the computer 108.

Location display software receives the distance signal and provides a real time location display 12 of the video camera 100 movement within the pipeline. The observations spreadsheet 14 enables an operator to enter information concerning a particular location of interest. An observations window 20 provides a list of categories and comments for entry into the observations spreadsheet 14. The video screen 18 displays the video feed of the video camera 100. The distance display 16 receives the distance signal and converts the signal into a numeric display.

The real time location display 12 includes an internal space representation 22, and a maintenance device icon 24. At least one line is preferably used to illustrate the internal space representation 22. However, other graphical representations of the internal space may also be used, besides the at least one line. A starting manhole 28 and an ending manhole may be used to terminate the end of the at least one line. However, the manholes would not be needed for representing a small section of sewer pipeline or for other nonsewer applications. The maintenance device icon 24 moves lengthwise relative to the at least one line. The at least one line in FIG. 1 is shown as being vertical, but the orientation of the at least one line could be horizontal or at any angle.

Figure 4A:
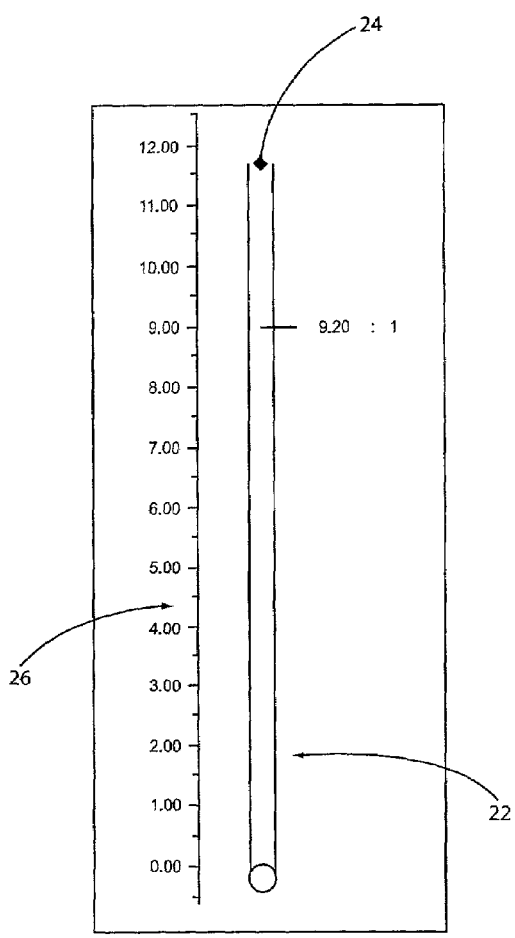
FIG. 4a is a real time location display of a method for real time display of maintenance device location in an internal space in accordance with the present invention.
Figure 4B:
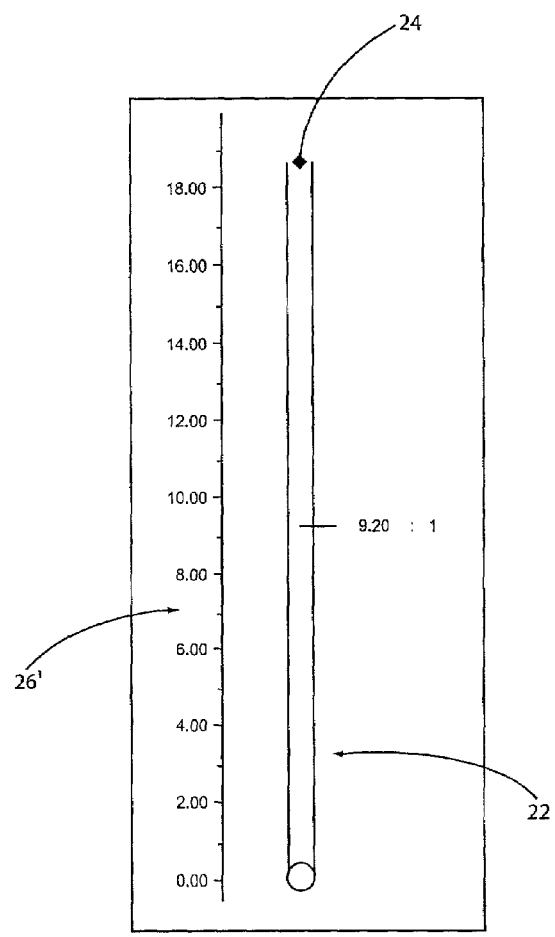
FIG. 4b is a real time location display of a method for real time display of maintenance device location in an internal space with a dimensional scale which has been scaled to reflect additional distance traveled by a maintenance device in accordance with the present invention.

Optionally, a dimensional scale 26 may be offset to a side of the internal space representation 22. The dimensional scale 26 can have divisions which are static, such that additional distance the video camera 100 travels adds a division to the dimensional scale. New divisions would be added to the dimensional scale 26 as the video camera 100 moves through a pipeline. With reference to FIGS. 4a & 4b, the dimensional scale 26 may be scaled such that the length of the dimensional scale always fits into a set window length. The dimensions disclosed in FIGS. 4a & 4b are given by way of example and not by way of limitation.

FIG. 4a shows a maintenance device icon 24 at 11.8 feet and a first observation at 9.2 feet. FIG. 4b shows a maintenance device icon 24 at 18.6 feet and the first observation at 9.2 feet. In FIG. 4b, the length of the dimensional scale 26' has not changed, but the illustrated length of the dimensional scale has changed from 12.0 feet to 18.0 feet. The scaled dimensional scale 26' is continually updated as the video camera 100 moves through a pipeline. It is preferable to use an x-y plotting package capable of scale to produce the scaled dimensional scale 26'. An x-y plotting package from Iocomp of Orlando, Fla. has been found to produce satisfactory results.

Figure 4D:
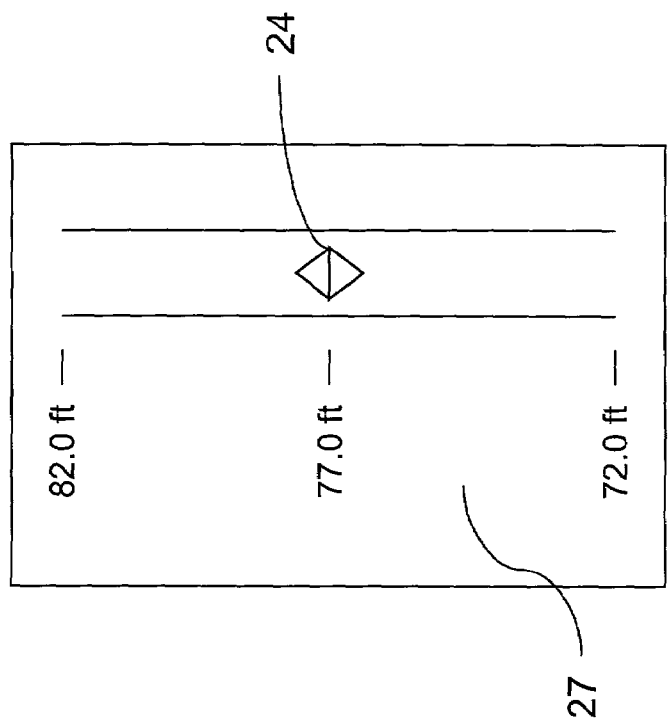
FIG. 4d is a real time dimensional scale with a moving window and fixed distance scale after movement of a maintenance device 72 feet of a method for real time display of maintenance device location in an internal space in accordance with the present invention.
Figure 4C:
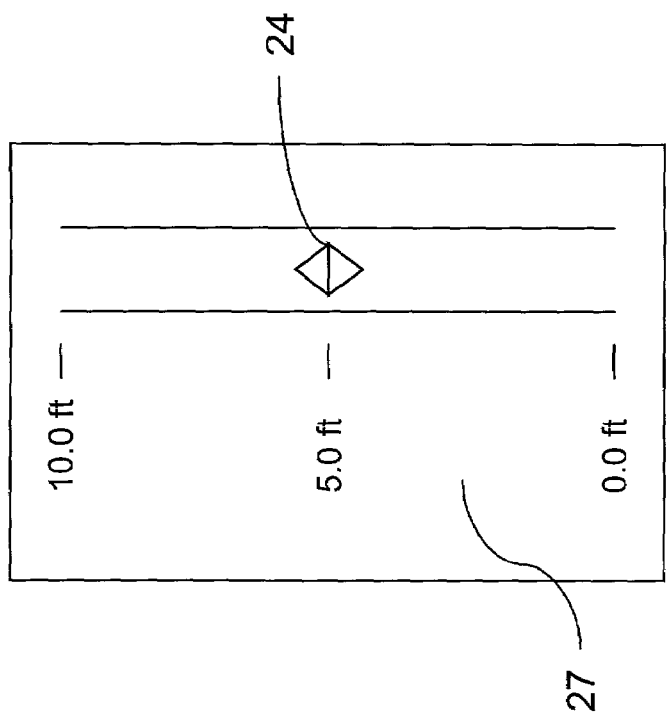
FIG. 4c is a real time dimensional scale with a moving window and fixed distance scale of a method for real time display of maintenance device location in an internal space in accordance with the present invention.

With reference to FIGS. 4c & 4d, a real time dimensional scale 27 is substituted for the dimensional scale 26. In FIG. 4c, the maintenance device icon 24 is currently at 5.0 feet. The distance of the real time dimensional scale 27 is 10.0 feet, because the maintenance device icon 24 is located in the center of the real time dimensional scale 27. With reference to FIG. 4d, the maintenance device icon 24 has traveled 72.0 feet. The lower dimension is 72.0 feet and the upper dimension is 82.0 feet. The maintenance device icon 24 is centered at 77.0 feet. Preferably, the distance of the real time dimensional scale 27 may be set to any appropriate distance.

The observations spreadsheet 14 disclosed in FIG. 1 is given by way of example and not by way of limitation. The observations spreadsheet 14 discloses the entry of information concerning a video camera. However, less information would be needed for other types of maintenance devices. Entry of information into the observations spreadsheet 14 will be represented on the real time location display 12. If the operator makes an observation at a distance through an internal space, the distance is shown on the observations spreadsheet 14 and preferably duplicated on the real time location display 12. Preferably, the distance of the observation is displayed with the number of the observation. With reference to FIG. 5, the first manhole circle 28 and second manhole circle 30 are assigned an identification by making an entry through the section window 32.

Figure 6:
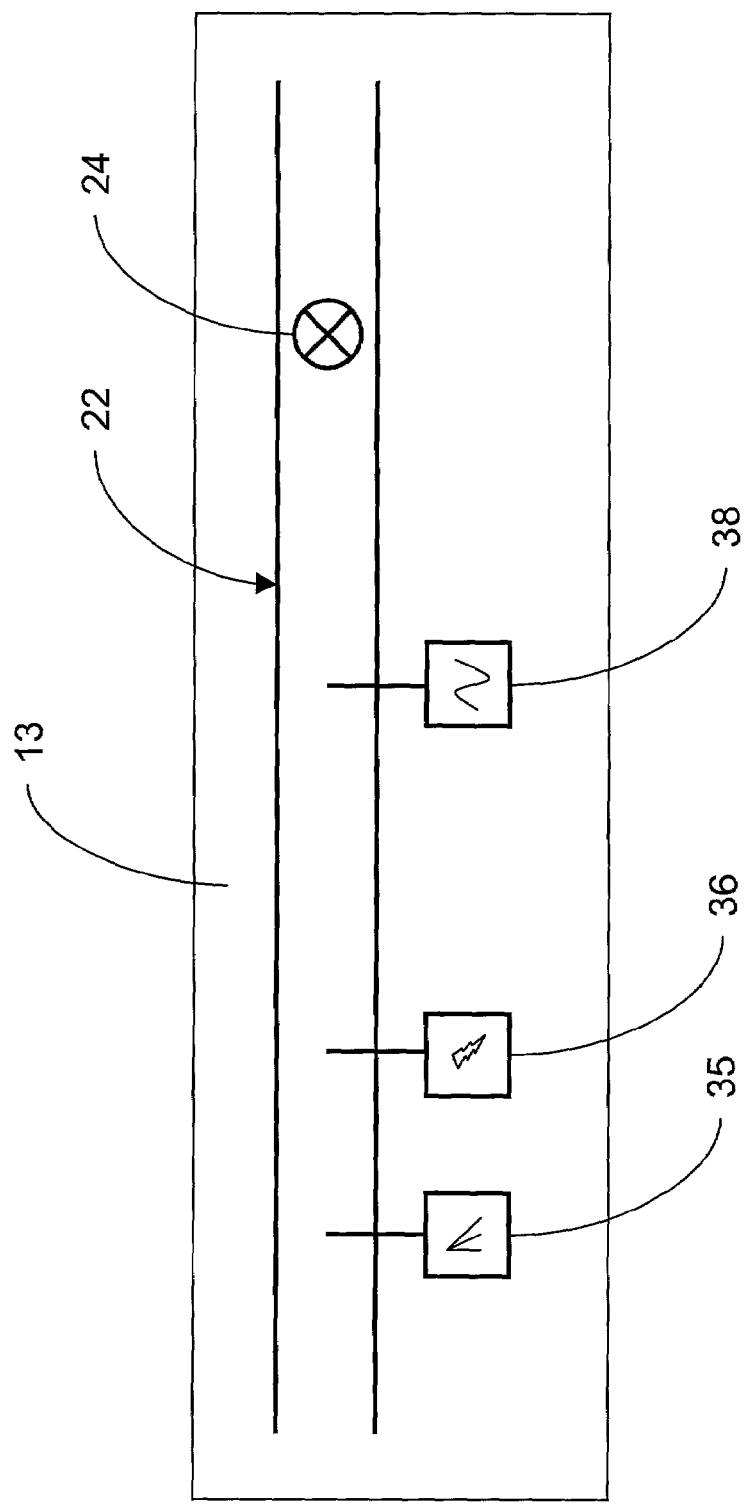
FIG. 6 is a second embodiment of a real time location display of a method for real time display of maintenance device location in an internal space in accordance with the present invention.

A second embodiment of a real time location display 13 is shown in FIG. 6. The real time location display 13 includes an internal space representation 22, and a maintenance device icon 24. Instead using a distance measurement and observation number to represent an observation, an icon is used. Preferably, there would be a plurality of icons which would each represent a particular observation. For example, there would be a root icon 35 to represent an ingrown root, a joint icon 36 to represent water infiltration, or a crack icon 38 to represent a crack in a pipe. A user could run the arrow of a mouse over the icon or click the icon to reveal the distance measurement, observation number, bubble help, multimedia information, or other observation information.

The observations spreadsheet 14 includes the ability to enter several characteristics of the observation. The observations spreadsheet 14 preferably includes columns for distance, category, comment, video, still, position, VCR, and notes. Distance of an observation is recorded in the distance column. Category of an observation is recorded in the category column. The category is a one word explanation of the observation. The category is preferably chosen from a list of categories in the observations window 20. If the category of "service" is chosen, a service connection 34 is displayed adjacent the dimension.

A comment concerning an observation is recorded in the comment column. The comment is an observation of a few words. A video or still frame of the observation is represented by a camcorder or video camera icon, respectively in the V and S columns. A video capture may be stored or a single picture of the observation. Position of an observation is recorded in the position column. The position of the observation is preferably represented by the value of an hour hand on a clock. The time where the observation occurs on a VCR tape is shown in the VCR column. The invention should not be limited to only using a VCR tape for recording the video feed, but other video recording hardware or methods may also be used. Other comments concerning an observation may be recorded in the Notes column.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method for the display of a maintenance device location in an interior of a pipeline including the steps of:

displaying a representation of an interior of a pipeline;

displaying the position of a maintenance device in real time as thereof is moving through the interior of the pipeline relative to said representation of an interior of a pipeline; and providing a plurality of observation icons, each one of said plurality of observation icons having a unique graphical representation of a particular observation of the interior of the pipeline from said maintenance device, displaying at least one observation icon adjacent an observation and said representation of an interior of a pipeline, each one of said plurality of observation icons being displayed when a particular observation is observed at some location in the interior of the pipeline.

2. The method for the display of a maintenance device location in an interior of a pipeline of claim 1, further including the step of:

providing a dimensional scale adjacent said representation of an interior of a pipeline, said dimensional scale having a plurality of divisions.

3. The method for the display of maintenance device location in an interior of a pipeline of claim 2, further including the step of:

scaling said dimensional scale to fit a set size window as the maintenance device travels through the interior of the pipeline, scaling a length of said representation of an interior of a pipeline.

4. The method for the display of maintenance device location in an interior of a pipeline of claim 1, further including the step of:

providing a real time dimensional scale adjacent said representation of an interior of a pipeline, said real time dimensional scale having a plurality of divisions.

5. The method for the display of maintenance device location in an interior of a pipeline of claim 1, further including the step of:

revealing information about the particular observation from said at least one icon with a mouse.

6. The method for the display of maintenance device location in an interior of a pipeline of claim 1, further including the step of:

terminating each end of said representation of an interior of a pipeline with a manhole circle having identification that corresponds to an actual manhole.

7. The method for the display of maintenance device location in an interior of a pipeline of claim 1, further including the step of:

entering information concerning a particular observation through one of an observation spreadsheet and an observations window.

8. A method of displaying the position of a maintenance device in an interior of a pipeline, comprising the steps of:

displaying a representation of an interior of a pipeline;

displaying at least one icon adjacent said representation of an interior of a pipeline, said at least one icon representing the position of a maintenance device in real time as thereof is moving through the interior of the pipeline relative to said representation of an interior of a pipeline; and displaying a location of a particular observation of the interior of the pipeline from said maintenance device with a distance measurement adjacent said representation of an interior of a pipeline.

9. The method of displaying the position of a maintenance device in an interior of a pipeline of claim 8, further comprising the step of:

providing a dimensional scale adjacent said representation of an interior of a pipeline, said dimensional scale having a plurality of divisions.

10. The method of displaying the position of a maintenance device in an interior of a pipeline of claim 9, further comprising the step of:
scaling said dimensional scale to fit a set size window as the maintenance device travels through the interior of the pipeline, scaling a length of said resprentation of an interior of a pipeline.

11. The method of displaying the position of a maintenance device in an interior of a pipeline of claim 8, further comprising the step of:
providing a real time dimensional scale adjacent said representation of an interior of a pipeline, said real time dimensional scale having a plurality of divisions.

12. The method of displaying the position of a maintenance device in an interior of a pipeline of claim 8, further comprising the step of:
revealing information about the particular observation from said at least one icon with a mouse.

13. The method of displaying the position of a maintenance device in an interior of a pipeline of claim 8, further comprising the step of:
terminating each end of said representation of an interior of a pipeline with a manhole circle having identification that corresponds to an actual manhole.

14. The method of displaying the position of a maintenance device in an interior of a pipeline of claim 8, further comprising the step of:
entering information concerning a particular observation through one of an observation spreadsheet and an observations window.

15. A method of displaying the position of a maintenance device in an interior of a pipeline, comprising the steps of:
displaying a representation of an interior of a pipeline;
displaying at least one icon adjacent said representation of an interior of a pipeline, said at least one icon representing the position of a maintenance device in real time as thereof is moving through the interior of the pipeline relative to said representation of an interior of a pipeline;
displaying a location of a particular observation of the interior of the pipeline from said maintenance device with a distance measurement adjacent said representation of an interior of a pipeline; and
providing a dimensional scale adjacent said representation of an interior of a pipeline, said dimensional scale having a plurality of divisions.

16. The method of displaying the position of a maintenance device in an interior of a pipeline of claim 15, further comprising the step of:
scaling said dimensional scale to fit a set size window as the maintenance device travels through the interior of the pipeline, scaling a length of said resprentation of an interior of a pipeline.

17. The method of displaying the position of a maintenance device in an interior of a pipeline of claim 15, further comprising the step of:
providing a real time dimensional scale adjacent said representation of an interior of a pipeline, said real time dimensional scale having a plurality of divisions.

18. The method of displaying the position of a maintenance device in an interior of a pipeline of claim 15, further comprising the step of:
revealing information about the particular observation from said at least one icon with a mouse.

19. The method of displaying the position of a maintenance device in an interior of a pipeline of claim 15, further comprising the step of:
terminating each end of said representation of an interior of a pipeline with a manhole circle having identification that corresponds to an actual manhole.

20. The method of displaying the position of a maintenance device in an interior of a pipeline of claim 15, further comprising the step of:
entering information concerning a particular observation through one of an observation spreadsheet and an observations window.

21. The method of displaying the position of a maintenance device in an interior of a pipeline of claim 15, further comprising the step of:
measuring the distance of travel of the maintenance device through the interior of the pipeline with a distance counter.

* * * * *